3,474,123
PRODUCTION OF ORGANOSILICON
COMPOUNDS
Patrick McAvoy Kelly and Robert Patton, Saltcoats, Scotland, assignors to Imperial Chemical Industries Limited, Millbank, London, England, a corporation of Great Britain
No Drawing. Filed July 16, 1965, Ser. No. 472,682
Claims priority, application Great Britain, Aug. 5, 1964, 31,816/64
Int. Cl. C07f 7/08; B01j 11/12
U.S. Cl. 260—448.2     23 Claims

ABSTRACT OF THE DISCLOSURE

A process for producing organosilicon compounds is disclosed wherein a silicon compound containing a silicon-bonded hydrogen atom and an unsaturated compound are reacted together in the presence of a complex of a platinum halide and a silicon compound containing at least one silicon-bonded vinyl or allyl group.

---

This invention relates to the production of organosilicon compounds and more particularly to the production of such compounds by the reaction of a compound containing a silicon-bonded hydrogen atom with a compound containing at least one unsaturated linkage.

It is known that silicon compounds containing a silicon-bonded hydrogen atom can be reacted with certain compounds containing unsaturated linkages. For the carrying out of such reactions a number of catalysts have been used or proposed for use, for example, organic peroxides, platinised charcoal and metals such as platinum, chloroplatinic acid and various complexes of a platinous halide and an olefine. These various catalysts are not, however, in all cases completely satisfactory.

According to the present invention a new and improved process for producing organosilicon compounds comprises reacting together a silicon compound containing a silicon-bonded hydrogen atom and an unsaturated compound in the presence of a complex of a platinous halide and a silicon compound having at least one silicon-bonded vinyl or allyl group.

Our invention also resides in a new class of complexes of a platinous halide with a silicon compound having a silicon-bonded vinyl or allyl group. These are suitable for use as catalysts in the reaction between a silicon compound having at least one silicon-bonded hydrogen atom and an unsaturated compound.

Any silicon compound containing at least one silicon atom having at least one and not more than two hydrogen atoms bonded thereto may be used in the process of our invention. The compound used may be, for example, a monomeric compound, a polymer, a copolymer or a mixture of such materials. Suitable materials which may be used include halogenosilanes, organohalogenosilanes, polysilanes, polysiloxanes, polysilcarbanes and like structures. In these compounds the organo groups may be the same or different and may be alkyl groups such as methyl, ethyl, propyl or butyl groups, cycloalkyl groups such as cyclohexyl groups, aryl groups such as phenyl groups, aralkyl groups such as benzyl groups, alkaryl groups such as tolyl groups or haloaryl groups such as mono- or di-chlorophenyl groups. It is, however, in general preferred that the organo groups should be methyl or phenyl groups. The organo groups may also be alkenyl groups such as vinyl or allyl groups or cycloalkenyl groups such as cyclohexenyl groups. Suitable examples of such compounds of silicon are methyldichlorosilane, dimethylchlorosilane, trichlorosilane, diphenylsilane, methylphenylchlorosilane, 1:4-bis(dimethylsilyl)-benzene, 1:3:5:7-tetramethylcyclotetrasiloxane, di-(trimethylsilyl)-polymethylhydrogensiloxanes and siloxanes containing both dimethylsiloxanyl units and methylhydrogensiloxanyl units.

The preferred compounds are, however, substituted silanes such as those of the general formula

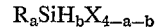

$$R_aSiH_bX_{4-a-b}$$

where R is a hydrocarbon group, X is a halogen atom, an alkoxy or aryloxy group, $a$ is 0, 1 or 2, $b$ is 1 or 2 and $a+b$ is not greater than 4; the hydrolysis products of these compounds; and the products obtained by cohydrolysis of these with other silanes such as, for example, diorganodihalogenosilanes.

By the phrase "an unsaturated reactant" as used herein we mean any unsaturated compound containing at least one pair of carbon atoms linked by a multiple bond except an aliphatic amine, an aldehydic compound or a compound having a cyano group on an unsaturated carbon atom. The unsaturated compounds may be purely organic compounds or may be organometallic compounds, for example, organosilicon compounds. It is also in general preferred that if the unsaturated reactant is a hydrocarbon it should have not more than 24 carbon atoms. Suitable compounds include ethylene, propylene, butylene and homologues thereof, the acetylene series, diolefines such as butadiene and its homologues, alkenynes such as vinylacetylene and divinylacetylene, alicyclic substances such as cyclopentene and cyclohexene, organosilicon compounds such as vinyltrimethylsilane, allytrimethylsilane, diallyldimethylsilane, diallytetramethyldisiloxane, methylvinylpolysiloxanes containing varying proportions of vinyl groups, esters of unsaturated acids containing not more than 18 carbon atoms such as methyl or ethyl oleate, crotonate, acrylate or methacrylate, esters of unsaturated alcohols such as vinyl acetate, allyl acetate and butenyl acetate and the like.

It may in some cases be desirable to have the unsaturated group and the Si-H group present in the same molecule in which case the reaction product is a polymeric material. If the molecule has only one silicon-bonded hydrogen atom and one unsaturated group a linear or cyclic polymer is formed. Examples of suitable silanes for this purpose are dimethylvinylsilane, diphenylvinylsilane, methylphenylvinylsilane, 1-(dimethylsilyl)-4-(dimethylvinylsilyl)-benzene, allylmethylphenylsilane and allyldiphenylsilane.

A wide variety of sillicon compounds containing a silicon-bonded vinyl or allkyl group may be used to form the complex with the platinous halide. These silicon compounds may also contain organo groups other than the vinyl or allyl groups, for example, such as methyl, phenyl and cyclohexyl groups. Suitable compounds which may be used include, for example, tetravinylcyclotetrasiloxane, dimethylphenylvinylsilane. Copolymers consisting essentially of dimethylsiloxanyl units and methylvinylsiloxanyl units are also eminently suitable. The platinous halide with which the silicon compound is formed into a complex may be, for example, the chloride, bromide or iodide but is preferably the chloride. The complex may be formed directly, for example, in the manner described by Kharasch, J.A.C.S., 1936, 58, 1733 or by McNevin, Giddings & Foris, Chemistry & Industry, 1958, 557. Alternatively the complex may be prepared by olefin interchange after first preparing a complex of another unsaturated compound with a platinous halide. Suitable complexes which may be used in this latter method to form the complex of the platinous halide and the vinyl- or allyl-containing silicon compound include, for example, those of ethylene, propylene, butylene, cyclohexene and styrene with platinous chloride.

The proportion of platinum salt complex to the two reactants may vary widely, for example, from $10^{-2}$ to $10^{-8}$ moles per mole of unsaturated reactant. It is, however, normally preferred to use proportions of the order of from $10^{-4}$ to $10^{-6}$ moles per mole of unsaturated reactant.

The reaction may be carried out over a wide range of temperature and the optimum temperature in any specific reaction will depend largely on the nature of the reactants. It is normally convenient to carry out the reaction at a temperature not greater than 300° C. but the maximum temperature possible will be determined by the stability of the reactants and the desirability of avoiding thermal decomposition. It is, however, normally preferred to initiate the reaction at a temperature within the range from 10 to 150° C. and to maintain the temperature substantially within this range.

The time required to complete the reaction will also depend on the specific reactants, the reaction temperature and the catalyst concentration. Normally a reaction time of up to eight hours is adequate and in many cases a substantially quantitative yield of product is obtained in a reaction time of the order of 30 minutes or less.

The reaction may be carried out at atmospheric or super-atmospheric pressure. The choice of conditions will depend largely on the nature of the reactants, for example, in the case of non-volatile reactants it may well be convenient to carry out the reaction at atmospheric pressure while in the case of reactants which are gaseous at ordinary temperatures reaction under super-atmospheric pressure may well be more convenient.

One very important advantage of the complexes of our invention is that they are soluble in the organosilicon compounds used in the reaction with the unsaturated compound. Because of this the reaction can be carried out without the addition of any solvent and thus the difficulties and hazards attendant on the use thereof are avoided.

Our invention is further illustrated by the following examples in which all parts and percentages are by weight.

Example 1

A complex of platinous chloride and cyclohexene was prepared by reacting together platinic chloride and cyclohexene in the manner described by Kharasch (loc. cit.). 0.03 part of the complex so prepared was added to 10 parts of 1:3:5:7-tetramethyl-1:3:5:7-tetravinylcyclotetrasiloxane. Cyclohexene was liberated and the yellow solution so obtained was filtered to give a clear solution of the siloxane-platinum complex.

Example 2

0.3 part of the complex of cyclohexene with platinous chloride prepared in Example 1 was added to 100 parts of a copolymer consisting of dimethylsiloxanyl and methylvinylsiloxanyl units in the ratio 96:4 and of viscosity 4000 cp. at 20° C. The mixture so obtained was heated at 80° C. for 2 hours after which cyclohexene could no longer be detected. It was then centrifuged and the clear fluid of siloxane-platinum complex decanted.

Example 3

0.3 part of the complex of platinous chloride and cyclohexene prepared in Example 1 was added to 100 parts of a copolymer consisting of dimethylsiloxanyl units and methylvinylsiloxanyl units in the ratio 99.75:0.25 and of average molecular weight 500,000. The so obtained mixture was milled on a two roll mill after which it was heated at 80° C. for 2 hours and the liberated cyclohexene removed to give the siloxane-platinum complex.

Example 4

5 parts of 1:3:5:7-tetramethylcyclotetrasiloxane were added to 8.6 parts of styrene in 15 parts of toluene and 0.1 part of the complex prepared in Example 1 added thereto. The mixture was heated at 120° C. for one hour after which the toluene was removed. The mass was then cooled to give an addition product which was a colourless oil of high boiling point.

Similar results were obtained on repeating the process using the complexes prepared in Examples 2 and 3.

Example 5

1 part of the complex prepared in Example 1 was added to a mixture of 100 parts of a copolymer of viscosity 4000 cp. at 20° C. and consisting of dimethylsiloxanyl units and methylvinylsiloxanyl units in the ratio 96:4 and 5 parts of a methylhydrogenpolysiloxane of average molecular weight 3000. The mixture was then heated at 100° C. for 15 minutes and there was thus obtained a cross-linked glass-like mass.

Similar results were obtained on repeating the process using the complex of Example 2.

Example 6

0.025 part of the complex prepared in Example 1 was added to 3.6 parts of methylphenylvinylsilane at 20° C. Over a period of 10 minutes the temperature rose to 38° C. after which the mixture was heated to 120° C. for 1 hour. A viscous mass was obtained on cooling.

Similar results were obtained on repeating the process using the complexes of Examples 2 and 3.

What we claim is:

1. A process for producing organosilicon compounds comprising reacting together a silicon compound containing a silicon-bonded hydrogen atom, said silicon compound being selected from the group consisting of a substituted silane of the general formula $R_aSiH_bX_{4-a-b}$, a hydrolysis product of a silane of the general formula $R_aSiH_bX_{4-a-b}$, a cohydrolysis product of a silane of the general formula $R_aSiH_bX_{4-a-b}$ and a dihydrocarbyldihalogenosilane where R is a hydrocarbon group, X is a halogen atom, and alkoxy or aryloxy group, $a$ is 0, 1 or 2, $b$ is 1 or 2 and $a+b$ is not greater than 4, and an unsaturated compound containing at least one pair of aliphatic carbon atoms linked by a multiple bond except an aliphatic amine, an aldehydic compound or a compound having a cyano group on an unsaturated carbon atom, in the presence of a complex of a platinum halide and a silicon compound containing at least one silicon-bonded group which is a member selected from the group consisting of vinyl and allyl.

2. A process as claimed in claim 1 wherein the silicon compound containing a silicon-bonded hydrogen atom is selected from the group consisting of a halogenosilane, a hydrocarbylhalogenosilane and a polysiloxane.

3. A process according to claim 1 wherein the platinum halide is a bromide or iodide.

4. A process according to claim 1 wherein the platinum halide is a chloride.

5. A process as claimed in claim 1 wherein the silicon compound containing silicon-bonded hydrogen is an organosilicon compound and the organo groups are selected from the group consisting of alkyl, cycloalkyl, aryl, aralkyl, alkaryl, alkenyl, cycloalkenyl and haloaryl groups.

6. A process according to claim 5 wherein the organo groups are methyl groups.

7. A process according to claim 5 where the organo groups are phenyl groups.

8. A process according to claim 5 wherein the organo groups are ethyl, propyl, butyl, cyclohexyl, benzyl, tolyl, mono- or dichlorophenyl, vinyl, allyl or cyclohexenyl groups.

9. A process according to claim 5 wherein the organosilicon compound is methyldichlorosilane, dimethylchlorosilane, trichlorosilane, diphenylsilane, methylphenylchlorosilane, 1:4 - bis - (dimethylsilyl)benzene, 1:3:5:7 - tetramethylcyclotetrasiloxane, a di(trimethylsilyl)polymethylhydrogensiloxane or a siloxane containing dimethylsiloxanyl and methylhydrogensiloxanyl units.

10. A process according to claim 1 wherein the unsaturated reactant is a hydrocarbon having not more than 24 carbon atoms.

11. A process as claimed in claim 10 wherein the hydrocarbon is selected from the group consisting of ethylene, propylene, butylene, acetylene, butadiene, vinylacetylene, divinylacetylene, cyclopentene and cyclohexene.

12. A process as claimed in claim 11 wherein the organosilicon compound is selected from the group consisting of vinyltrimethylsilane, allyltrimethylsilane, diallyldimethylsilane, diallyltetramethyldisiloxane and a methylvinylpolysiloxane.

13. A process according to claim 1 wherein the unsaturated reactant is an organosilicon compound.

14. A process according to claim 13 wherein the compound containing a silicon-bonded hydrogen atom and the unsaturated compound are the same.

15. A process according to claim 1 wherein the reaction is carried out at a temperature not greater than 300° C.

16. A process according to claim 15 wherein the temperature is from 10 to 150° C.

17. A process according to claim 1 wherein the silicon compound containing at least one silicon-bonded vinyl or allyl group contains other organo groups.

18. A process according to claim 17 wherein the silicon compound is tetravinylcyclotetrasiloxane.

19. A process according to claim 17 wherein the other organo groups are selected from the group consisting of methyl, phenyl or cyclohexyl groups.

20. A process according to claim 1 wherein the complex is used in amount from $10^{-2}$ to $10^{-8}$ moles per mole of unsaturated reactant.

21. A process according to claim 20 wherein the amount is from $10^{-4}$ to $10^{-6}$ moles per mole of unsaturated reactant.

22. A process according to claim 19 wherein the silicon compound is dimethylphenylvinylsilane.

23. A process according to claim 19 wherein the silicon compound is a copolymer consisting essentially of dimethylsiloxanyl units and methylvinylsiloxanyl units.

References Cited
UNITED STATES PATENTS

| | | | |
|---|---|---|---|
| 3,012,006 | 12/1961 | Holbrook et al. | 260—448.2 XR |
| 3,159,601 | 12/1964 | Ashby | 260—448.2 XR |
| 3,188,299 | 6/1965 | Chalk | 252—429 XR |
| 3,220,972 | 11/1965 | Lamoreaux | 252—429 XR |

TOBIAS E. LEVOW, Primary Examiner

P. F. SHAVER, Assistant Examiner

U.S. Cl. X.R.

252—429; 260—46.5